United States Patent [19]
Goddard et al.

[11] Patent Number: 5,867,157
[45] Date of Patent: Feb. 2, 1999

[54] GRAPHICAL INTERFACE METHOD, APPARATUS AND APPLICATION FOR CREATING AND MODIFYING A LIST OF VALUES WITH MULTIPLE COMPONENTS

[75] Inventors: Joan Stagaman Goddard, Boulder, Colo.; Minh Trong Vo, Mountain View, Calif.

[73] Assignee: International Business Machines Corporation, Armonk, N.Y.

[21] Appl. No.: 696,753

[22] Filed: Aug. 14, 1996

[51] Int. Cl.$^6$ ............................................ G06F 3/14
[52] U.S. Cl. ...................... 345/333; 345/340; 345/335
[58] Field of Search ................... 345/333, 334, 345/335, 336, 339, 326, 347, 352, 354, 340; 707/505, 507

[56] References Cited

U.S. PATENT DOCUMENTS

| | | | |
|---|---|---|---|
| 4,464,652 | 8/1984 | Lapson et al. | 345/165 |
| 5,001,654 | 3/1991 | Winiger et al. | 707/529 |
| 5,062,060 | 10/1991 | Kolnick | 345/339 |
| 5,072,412 | 12/1991 | Henderson | 345/346 |
| 5,095,512 | 3/1992 | Roberts et al. | 382/245 |
| 5,117,372 | 5/1992 | Petty | 345/335 |
| 5,119,476 | 6/1992 | Texier | 345/347 |
| 5,121,477 | 6/1992 | Koopmans et al. | 395/333 |

(List continued on next page.)

FOREIGN PATENT DOCUMENTS

| | | |
|---|---|---|
| 2097540 | 12/1994 | Canada . |
| 0 587 394 A1 | 3/1994 | European Pat. Off. . |
| 0 62 728 A1 | 11/1994 | European Pat. Off. . |
| 04-361373 | 12/1992 | Japan . |
| 05-313845 | 11/1993 | Japan . |
| 06-4117 | 1/1994 | Japan . |
| 06-215095 | 8/1994 | Japan . |
| 07-129597 | 5/1995 | Japan . |

OTHER PUBLICATIONS

"Device Independent Graphics Using Dynamic Generic Operator Selection," *IBM Technical Disclosure Bulletin,* Apr. 1983, vol. 25, No. 11A, pp. 5477–5480.

"Error–Tolerant Dynamic Allocation of Command Processing Work Space," *IBM Technical Disclosure Bulletin,* Jun. 1984, vol. 27, No. 1B, pp. 584–586.

"Means for Computing the Max of a Set of Variables Distributed Across Many Processors," *IBM Technical Disclosure Bulletin,* Sep. 1990, vol. 33, No. 4, pp. 8–12.

"Graphical User Interface for the Distributed System Namespace," *IBM Technical Disclosure Bulletin,* Jul. 1992, vol. 35, No. 2, pp. 335–336.

"Graphical Query System," *IBM Technical Disclosure Bulletin,* Nov. 1993, vol. 36, No. 11, pp. 615–616.

"Configuration Data Set Build Batch Program," *IBM Technical Disclosure Bulletin,* Nov. 1993, vol. 36, No. 11, p. 571.

Self–Contained Reusable Programmed Components, *IBM Technical Disclosure Bulletin,* Jul. 1995, vol. 38, No. 7, pp. 283–285.

"IBM Printing Systems Manager for AIX Overview," *International Business Machines Corporation,* Second Edition, Feb. 1996.

(List continued on next page.)

*Primary Examiner*—Matthew M. Kim
*Assistant Examiner*—Crescelle N. dela Torre
*Attorney, Agent, or Firm*—David W. Victor

[57] ABSTRACT

The invention is carried out in the following environment. The computer system has at least a visual operator interface, an operating system for operating applications within the computer system, and memory for storing at least part, preferably all, of an application. The present invention provides a method, apparatus, and application for constructing in a graphical user interface a list of values, with each value having multiple components. Also disclosed is a means for adding, modifying, and deleting values or components of values. Additionally disclosed is a means for copying selected values or components of values from one entry to another entry in the list of values.

8 Claims, 9 Drawing Sheets

U.S. PATENT DOCUMENTS

| | | | |
|---|---|---|---|
| 5,140,677 | 8/1992 | Fleming et al. | 345/348 |
| 5,140,678 | 8/1992 | Torres | 345/350 |
| 5,164,911 | 11/1992 | Juran et al. | 364/578 |
| 5,206,950 | 4/1993 | Geary et al. | 395/702 |
| 5,208,907 | 5/1993 | Shelton et al. | 707/505 |
| 5,228,123 | 7/1993 | Heckel | 345/334 |
| 5,233,687 | 8/1993 | Henderson et al. | 345/346 |
| 5,247,651 | 9/1993 | Clarisse et al. | 345/500 |
| 5,249,265 | 9/1993 | Liang | 345/356 |
| 5,255,359 | 10/1993 | Ebbers et al. | 345/433 |
| 5,276,901 | 1/1994 | Howell et al. | 707/9 |
| 5,287,447 | 2/1994 | Miller et al. | 345/342 |
| 5,307,451 | 4/1994 | Clark | 345/427 |
| 5,315,703 | 5/1994 | Matheny et al. | 345/507 |
| 5,317,687 | 5/1994 | Torres | 345/349 |
| 5,317,730 | 5/1994 | Moore et al. | 707/100 |
| 5,345,550 | 9/1994 | Bloomfield | 345/353 |
| 5,367,619 | 11/1994 | Dipaolo et al. | 707/506 |
| 5,371,844 | 12/1994 | Andrew et al. | 345/334 |
| 5,377,317 | 12/1994 | Bates et al. | 345/342 |
| 5,388,255 | 2/1995 | Pytlik et al. | 707/4 |
| 5,394,521 | 2/1995 | Henderson et al. | 345/346 |
| 5,404,439 | 4/1995 | Moran et al. | 345/328 |
| 5,410,695 | 4/1995 | Frey et al. | 395/680 |
| 5,410,704 | 4/1995 | Norden-Paul et al. | 395/671 |
| 5,412,776 | 5/1995 | Bloomfield et al. | 345/346 |
| 5,414,806 | 5/1995 | Richards | 345/435 |
| 5,416,900 | 5/1995 | Blanchard et al. | 345/346 |
| 5,418,950 | 5/1995 | Li et al. | 707/4 |
| 5,428,554 | 6/1995 | Laskoski | 364/550 |
| 5,428,776 | 6/1995 | Rothfield | 707/4 |
| 5,438,659 | 8/1995 | Notess et al. | 345/335 |
| 5,450,545 | 9/1995 | Martin et al. | 345/701 |
| 5,454,071 | 9/1995 | Siverbrook et al. | 345/441 |
| 5,454,106 | 9/1995 | Burns et al. | 707/4 |
| 5,459,825 | 10/1995 | Anderson et al. | 345/433 |
| 5,459,832 | 10/1995 | Wolf et al. | 345/342 |
| 5,463,724 | 10/1995 | Anderson et al. | 707/503 |
| 5,473,745 | 12/1995 | Berry et al. | 345/340 |
| 5,479,599 | 12/1995 | Rockwell et al. | 345/349 |
| 5,481,666 | 1/1996 | Nguyen et al. | 345/357 |
| 5,483,651 | 1/1996 | Adams et al. | 707/1 |
| 5,487,141 | 1/1996 | Cain et al. | 345/435 |
| 5,491,795 | 2/1996 | Beaudet et al. | 345/346 |
| 5,497,454 | 3/1996 | Bates et al. | 345/344 |
| 5,497,484 | 3/1996 | Potter et al. | 707/200 |
| 5,600,778 | 2/1997 | Swanson et al. | 345/333 |
| 5,603,034 | 2/1997 | Swanson | 345/333 X |
| 5,774,667 | 6/1998 | Garvey et al. | 395/200.52 |

OTHER PUBLICATIONS

"IBM Printing Systems Manager for AIX Administrating," *International Business Machines Corporation,* 1995.

"Matching Three–Dimensional Objects Using a Relational Paradigm," *Pattern Recognition,* vol. 17, No. 4, pp. 385–405, 1984.

"A Multicolumn List–Box Container for OS/2," *Dr. Dobb's Journal,* May 1994, vol. 19, No. 5, pp. 90–94.

GRAPHICAL INTERFACE METHOD, APPARATUS AND APPLICATION FOR CREATING AND MODIFYING A LIST OF VALUES WITH MULTIPLE COMPONENTS

BACKGROUND OF THE INVENTION AND STATE OF THE PRIOR ART

1. Field of the Invention

The present invention relates to graphical user interfaces. More particularly, the invention relates to a method, apparatus and application for creating and modifying a list of values, each value having multiple components.

2. Description of Related Art

In order to better understand the terms utilized in this patent application, a brief background definition section will be presented so that the reader will have a common understanding of the terms employed and associated with the present invention.

A "user interface" is a group of techniques and mechanisms that a person employs to interact with an object. The user interface is developed to fit the needs or requirements of the users who use the object. Commonly known user interfaces can include telephone push buttons or dials, or pushbuttons such as on a VCR or a television set remote. With a computer, many interfaces not only to allow the user to communicate with the computer but also allow the computer to communicate with the user. These would include (1) command-line user interfaces (i.e., user remembered commands which he/she enters, e.g. "C:>DIR" in which "DIR" is a typical DOS command entered at the "C" prompt); (2) menu-driven user interfaces which present an organized set of choices for the user, and (3) graphical user interfaces, ("GUI") in which the user points to and interacts with elements of the interface that are visible, for example by a "mouse" controlled arrow or cursor.

An example of a GUI user interface is that which is offered by International Business Machines Corporation (IBM) under the name "Common User Access" ("CUA"). This GUI incorporates elements of object orientation (i.e., the user's focus is on objects and the concept of applications is hidden). Object orientation of the interfaces allow for an interconnection of the working environment in which each element, called an "object," can interact with every other object. The objects users require to perform their tasks and the objects used by the operating environment can work cooperatively in one seamless interface. With object oriented programming using a GUI, the boundaries that distinguish applications from operating systems are no longer apparent or relevant to the user.

In connection with this patent application, an "object" means any visual component of a user interface that a user can work with as a unit, independent of other items, to perform a task. By way of example, a spreadsheet, one cell in a spreadsheet, a bar chart, one bar in a bar chart, a report, a paragraph in a report, a database, one record in a database, and a printer are all objects. Each object can be represented by one or more graphic images, called "icons," with which a user interacts, much as a user interacts with objects in the real world. (NOTE: In the real world, an object might be an item that a person requires to perform work. As an example, an architect's objects might include a scale, T-square, and a sharp pencil, while an accountant's objects might include a ledger and a calculator.) However, it is not required that an object always be represented by an icon, and not all interaction is accomplished by way of icons.

While classification of objects may follow many different definitions, each class of objects has a primary purpose that separates it from the other classes. A class may be looked at as a group of objects that have similar behavior and information structures. In addition, each of the objects enumerated and defined below may contain other objects. There are three primary classes of objects. Each is discussed below.

(1) Container Object

This object holds other objects. Its principal purpose is to provide the user with a way to hold or group related objects for easy access or retrieval. An operating system, e.g. OS/2® (a trademark of IBM Corporation) or Windows® (a trademark of Microsoft Corporation), typically provides a general-purpose container, for example a folder or a program group—that holds any type of object, including other containers. For example, imagine a program group (or folder) labeled "PRIVATE FOLDER—ICONS". In the program group are three folder icons labeled "REPORTS", "PORTFOLIO" and "LETTERS". By selecting with a mouse or other pointing device the icon "PORTFOLIO", another window may open showing three more icons labeled "OIL PAINTINGS", "WATERCOLORS", and "PORTRAITS". In turn, selecting any of those three icons may open additional windows with further icons representing further subdivisions, or cross-references (e.g., "CUSTOMERS").

(2) Data Objects:

The principal purpose of a data object is to convey information. This information may be textual or graphical information or even audio or video information. For example, a business report displayed on the computer monitor may contain textual information concerning sales of "gadgets" over the past few years (text object) to all customers and also may contain a bar chart (graphic object) to pictorially depict, on the same monitor screen, the sales information.

(3) Device Objects:

The principal purpose of a device object is to provide a communication vehicle between the computer and another physical or logical object. Many times the device object represents a physical object in the real world. For example, a mouse object or icon can represent the user's pointing device, and a modem object can represent the user's modem, or a printer object or icon can represent the user's printer. Other device objects are purely logical, e.g. an out-basket icon representing outgoing electronic mail; a wastebasket object or icon representing a way the user may "trash" or dispose of other objects.

As can be seen from the foregoing, a class of objects may be defined as a description of the common characteristics of several objects, or a template or model which represents how the objects contained in the class are structured. While there are further ways in which to define objects and classes of objects, typically each class of objects will include similar attributes, the values of which the user will alter, modify, replace or remove from time to time. For a more complete discussion of objects, attributes, object oriented interfaces etc. see "Object Oriented Interface Design: IBM Common User Access" (published by Que, ISBN 1-56529-170-0).

The present invention relates primarily to data objects. In a graphical user interface, the user frequently desires to construct a list of values, with each value having multiple components. The components may be of different types, for example, numeric, boolean, or alphabetic. In addition to creating the list, the user typically wants to modify the list, once created, by adding, deleting, or modifying values or certain components of values. Moreover, it is useful for the user to be able to copy values from one entry to another.

There are no standard solutions to these needs in the field of graphical user interfaces. Of course a variety of database products exist that provide various data management options. However, within graphical user interfaces there are no known solutions that adequately meet user needs.

SUMMARY OF THE INVENTION

In view of the above, it is a principal object of the present invention to provide a graphically oriented method, application and apparatus to construct a list of values, each value having multiple components.

Another object of the present invention is to permit the user to modify a list of values, each value having multiple components.

Yet another object of the present invention is to permit the user to copy selected values or components of values from one entry to another.

Still another object of the present invention is to provide an application which may be employed in a number of different computers, may be transported between different computers, and may be loaded into various computer environments.

The invention is carried out in the following environment. The computer system has at least a visual operator interface, an operating system for operating applications within the computer system, and memory for storing at least part, preferably all, of an application. The present invention provides a method, apparatus, and application for constructing in a graphical user interface a list of values, with each value having multiple components. Also disclosed is a means for adding, modifying, and deleting values or components of values. Additionally disclosed is a means for copying selected values or components of values from one entry to another entry in the list of values.

Other objects of the invention and a more complete understanding of the invention may be had by referring to the following description taken in conjunction with the accompanying drawings.

DESCRIPTION OF THE ILLUSTRATIVE EMBODIMENT(S)

Figure 1:
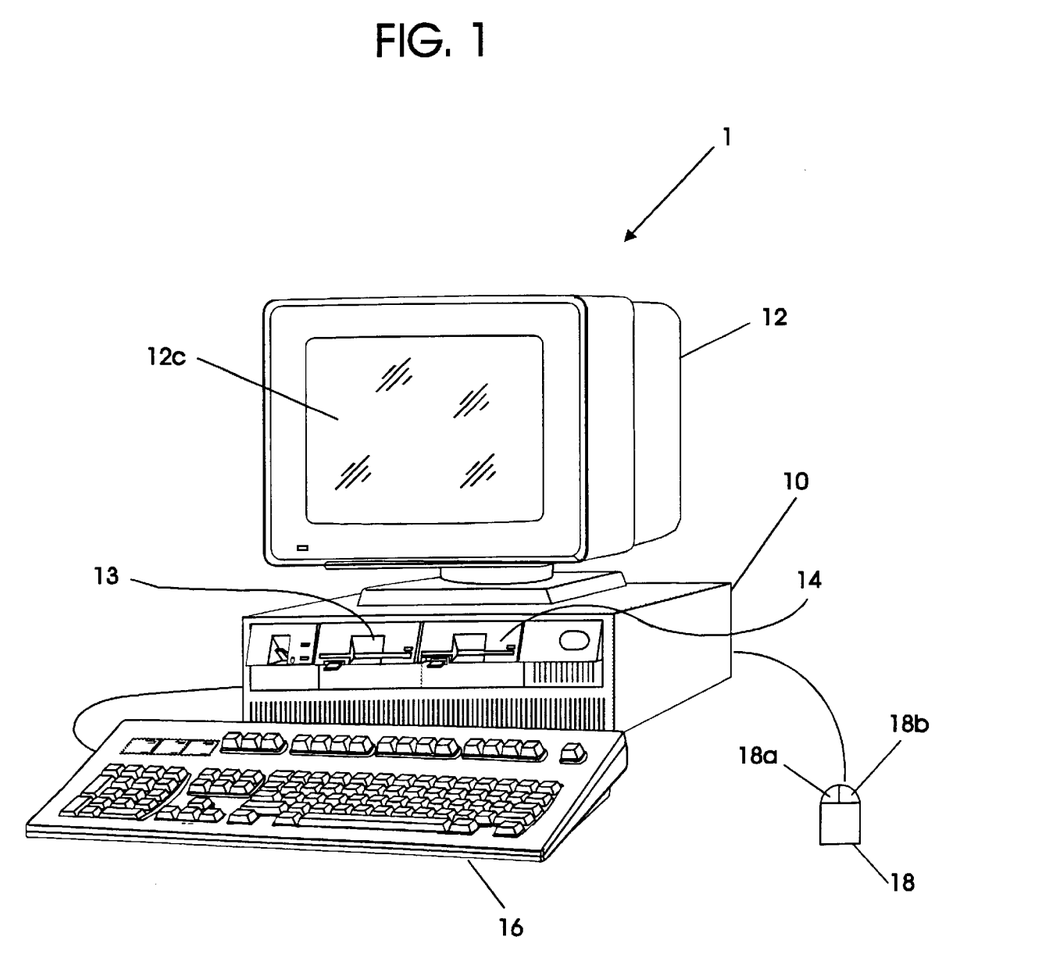
FIG. 1 illustrates a typical desktop computer system which may be employed to practice the novel method and application of the present invention.
Figure 2:
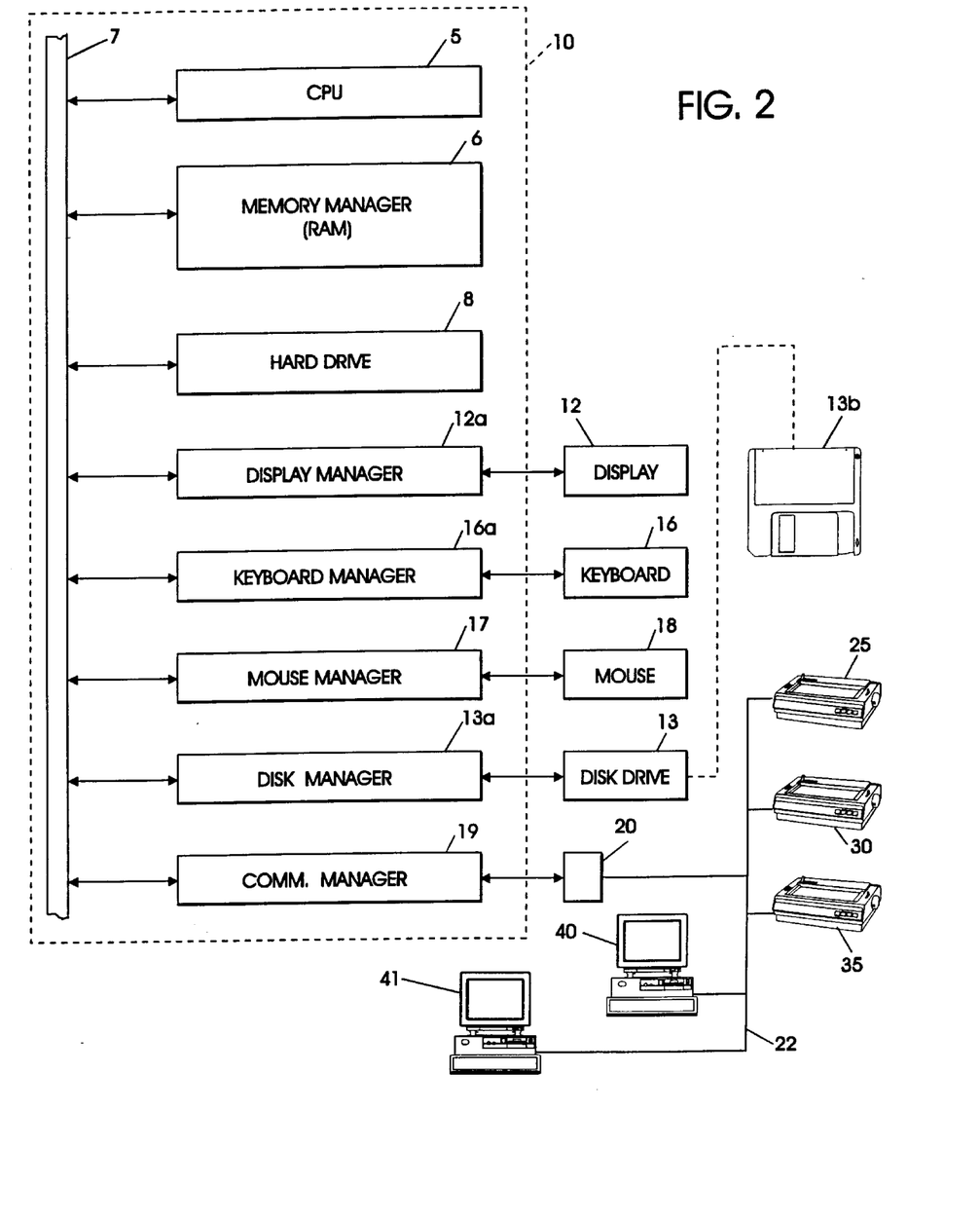
FIG. 2 is a block diagram illustrating a sample configuration of the computer system shown in FIG. 1.

Turning now to the drawings, and especially FIGS. 1 and 2, FIG. 1 diagrammatically shows a computer system 1 which may be connected to a Local Area Network system (LAN 20) as shown in FIG. 2.

As shown in FIG. 1, the computer system 1 comprises a main chassis 10, a display means or monitor 12, a connected keyboard 16 and a pointing device, in the present instance a mouse 18 which is operator controlled to move a pointer cursor 12b (shown in FIG. 3) on the display or monitor screen 12c. As shown in FIG. 2, the chassis 10 includes a central processing unit, or "CPU" 5, a memory manager and associated random access memory, or "RAM" 6, a fixed disk or hard drive 8 (which may include its associated disk controller), a display manager 12a which is connected externally to the chassis 10 of the display 12; a keyboard manager 16a, which through flexible cable (not shown) is connected to the keyboard 16; a mouse manager 17 (which in some instances may form part of the display manager 12a, and may be in the form of a software driver) for reading the motion of the mouse 18 and its control mouse buttons (MB) 18a and 18b, shown in FIG. 1. A disk manager or controller 13a which controls the action of the disk drive 13 (and an optional drive such as a magneto-optical or CD ROM drive 14) shown in FIG. 1, rounds out most of the major elements of the computer system 1.

The pointer element or cursor 12b can be moved over the display screen 12c by movement of the mouse 18. The mouse buttons (MB) 18a and 18b give commands to the operating system, usually through a software mouse driver provided by the mouse manufacturer. With the first mouse button (MB) 18a the operator can select an element indicated on the display screen 12c using the pointer or cursor 12b, i.e., signify that an action subsequently to be performed is to be carried out on the data represented by the indicated element on the display screen 12c. The system normally gives some visual feedback to the operator to indicate the element selected, such as a change in color, or a blocking of the icon. The second mouse button (MB) 18b may be a menu button, if desired. Conventionally, when the operator presses button 18b, a selection menu or dialog with system commands will appear on the display screen 12c. The operator may select an icon or item from the selection menu or input information into the dialog box as appropriate using the cursor 12b and the first mouse button (MB) 18a. Some menu items, if selected, may call up another menu or submenu for the operator to continue the selection process.

The use of a mouse and selection menus is well known in the art, for example U.S. Pat. No. 4,464,652 to Lapson et al. describes a selection menu of the pull-down type in combination with a mouse. It should be recognized, of course, that other cursor pointing devices may be employed, for example a joystick, ball and socket, or cursor keys on the keyboard.

The foregoing devices (and software drivers therefore) within the chassis 10 communicate with one another via a bus 7. To round out the computer system 1, an operating system (not shown) must be employed. If the computer system is a typical IBM-based system, the operating system may be DOS-based and include a GUI interface such as contained in OS/2®, or WINDOWS®, or other operating system of choice. If the computer system is based upon RISC (reduced instruction set computer) architecture, then the operating system employed may be, in the instance of an IBM-based RISC architectured System/6000®, AIX. Alternatively, if the computer system 1 is a large host computer, such as a an IBM 3090, it may be running an operating system such as MVS or VM.

In the illustrated instance, the computer system 1 includes an I/O (Input/Output) manager or communications manager 19 (shown in FIG. 2) which serves to link the computer system for communications with the outside world such as to a systems printer, a modem or a LAN controller (such as a Token ring or ETHERNET or even through a modem employing SDLC) such as shown at 20 in FIG. 2. The LAN controller may be incorporated inside the computer system 1 or located externally as shown diagrammatically in FIG. 2, as desired. The LAN controller 20 may connect to other computer systems 40 and 41 as well as to other printers such as printers 25, 30 and 35 by communications cable 22 and the like. However the method and application of the present invention works equally well with multiple objects serviced by a single computer system.

Figure 3:
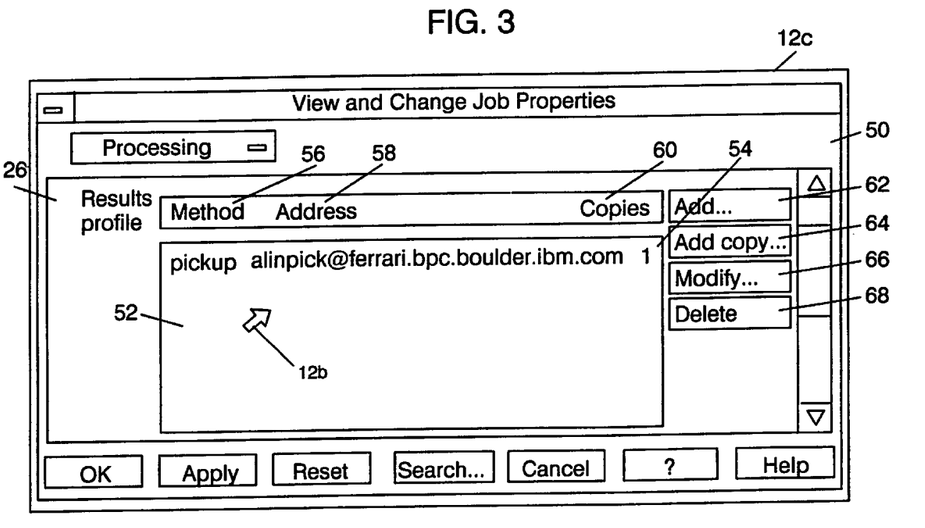
FIG. 3 is a typical window, in accordance with the present invention, showing a value in a list box with the value having multiple components.

Referring now to FIG. 3, the display screen 12c of the monitor 12 is shown with a window 50. As illustrated, a list box 52 contains a value 54 that has a number of components, 56, 58 and 60. Value 54 is one entry in the list box 52.

The components shown in FIG. 3, are method 56, address 58, and copies 60. In this example, there is an additional component, comment, which is scrolled to the right and therefore not visible in FIG. 3. From this example, it is clear that the components may be in a variety of formats. Components 56 and 58 are alphabetic, while component 60 is numeric. The components 56, 58, and 60 of the value 54 are listed horizontally in a row in the list box 52. Down the right hand side of window 50 are four pushbuttons 62, 64, 66, and 68. The Add Pushbutton 62 is selected to add a value (i.e., a new entry) to the list box 52. The Add Copy Pushbutton 64 is selected to copy a value from the list box 52 to create another entry in the list box 52. The Modify Pushbutton 66 is selected to modify an existing value in the list box 52. The Delete Pushbutton 68 is selected to delete an existing value in the list box 52. The operation of each of these pushbuttons is described in further detail below.

Figure 4:
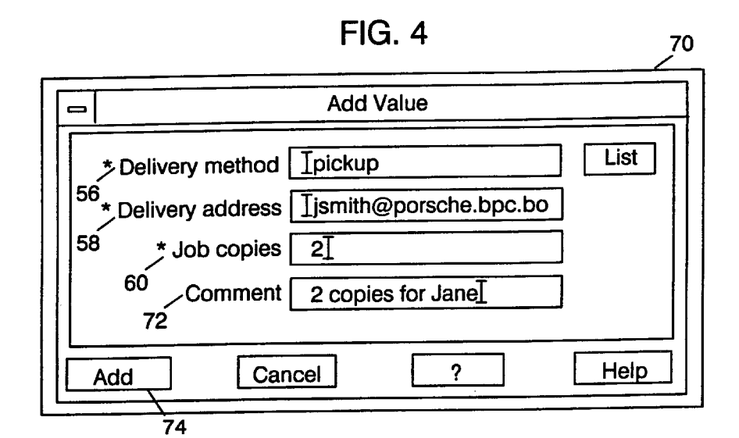
FIG. 4 is a typical window showing how new values are added to the list of values.
Figure 5:
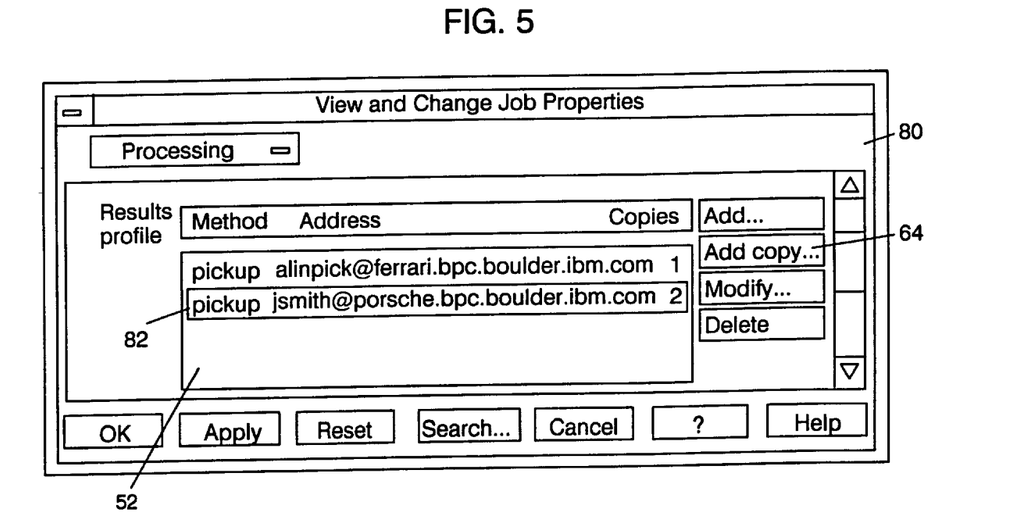
FIG. 5 is a typical window showing the added values in the list box.

FIG. 4 shows a typical window 70 to demonstrate how values are added to the list box 52. When the user selects the Add Pushbutton 62 in the window 50 in FIG. 3, the window 70 appears. The window 70 lists on a separate line each component of a value in the list box 52. The components are delivery method 56, delivery address 58, job copies 60, and comment 72. Note that the window 70 lists the full name of each component, whereas the list box 52 lists an abbreviated name for each component 56, 58, and 60. In addition, window 70 has a comment box 72 for additional information about the value or its components. The information in the comment box 72 is scrolled to the right in the list box 52. To add a value to the list box 52, the user completes each component 56 to 60 on the window 70 and adds any additional comments in the comment box 72. The user then selects the Add Pushbutton 74 at the bottom of window 70. The window 70 then closes and, as shown in FIG. 5, the window 80 appears. Window 80 is identical to window 50, except that the value 82 added in window 70 is shown in the list box 52.

Figure 6A:
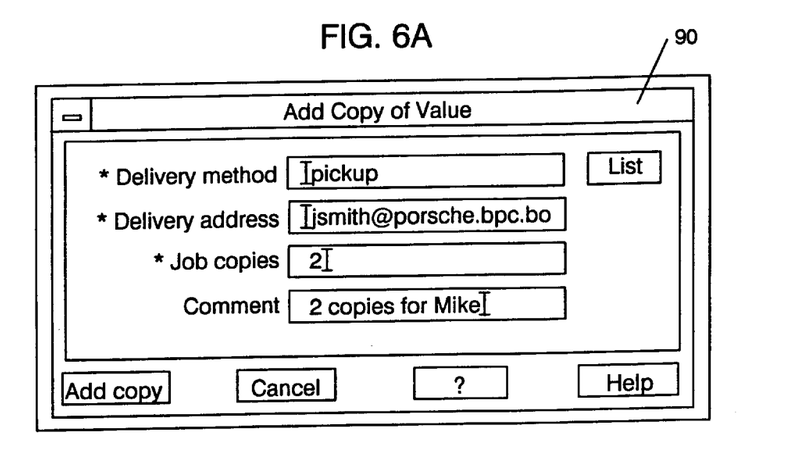
FIGS. 6A and 6B are typical windows showing the copying of a value already in the list box, and then modification of the copy.

Assume now that the user desires to copy value 82 to create a third entry in list box 52. The user selects Add Copy Pushbutton 64. This causes window 90 to appear, as shown in FIG. 6A. As can be seen in FIG. 6A, each of the components of value 82 have been "pre-filled in" to each component field on window 90. If the user then desires to make certain modifications to the components this can be done without the user having to re-enter all of the information for the value 82.

Figure 6B:
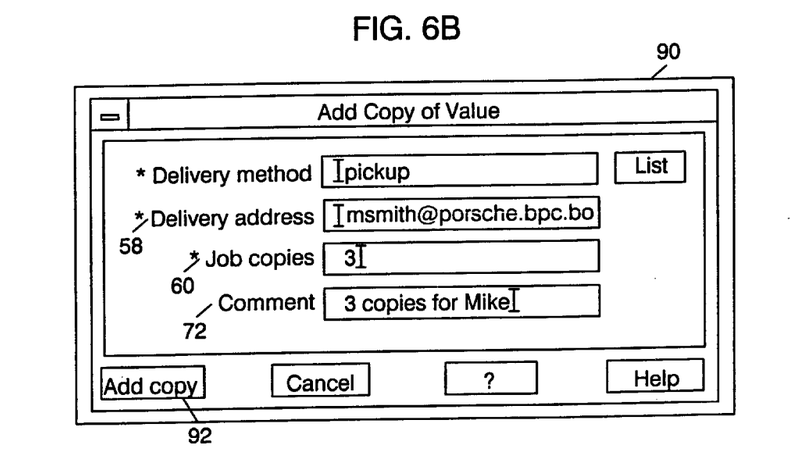
Figure 7:
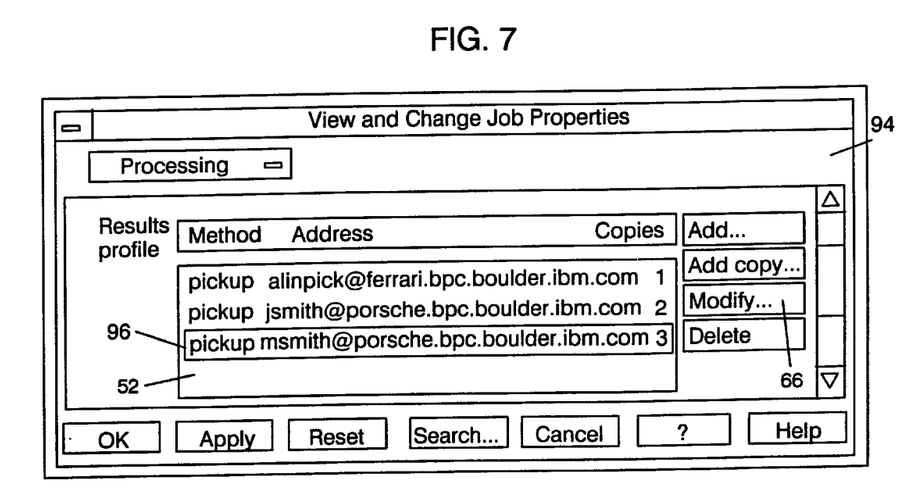
FIG. 7 is a typical window showing the added copy, as modified, in the list box.

As shown in FIG. 6B, minor modifications can be made to the delivery address component 58, the job copies component 60, and the comment box 72. When the modifications are complete, the user selects the Add Copy Pushbutton 92. This causes window 94 to appear, as shown in FIG. 7. As shown in FIG. 7, the new value 96 has been added to the list box 52.

Figure 8A:
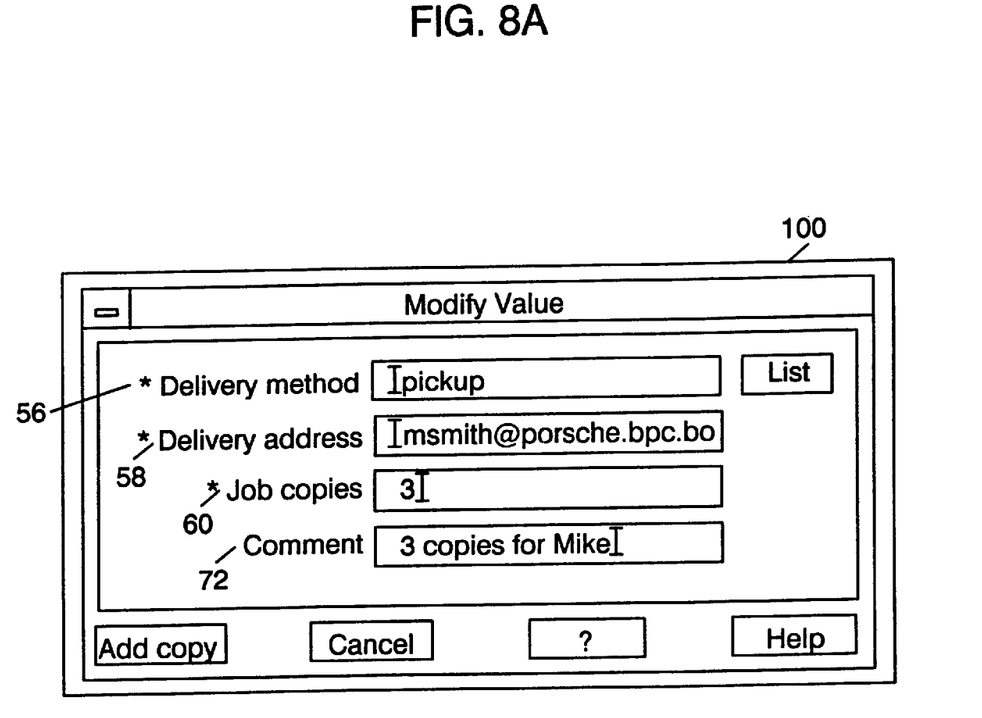
FIGS. 8A and 8B are typical windows showing the modification of existing values and components of values in the list box.
Figure 8B:
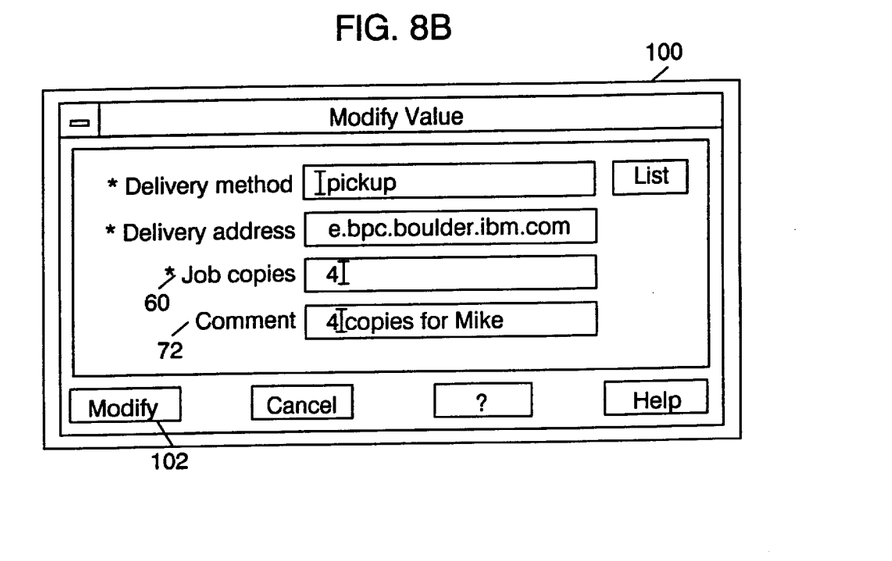

Now suppose the user desires to modify value 96. The user selects the Modify Pushbutton 66. This causes the window 100 shown in FIG. 8A to appear. Window 100 shows each component 56, 58, and 60 of value 96. Each component 56, 58, and 60 and the comment box 72 is "pre-filled-in" to correspond with the information for value 96 showing in the list box 52 and as previously entered by the user. The user can make minor changes to the job copies component 60 as shown in FIG. 8B. The user also can change the comment box 72 as shown in FIG. 8B. Of course, other modifications are possible also. The modifications shown are examples only.

Figure 9:
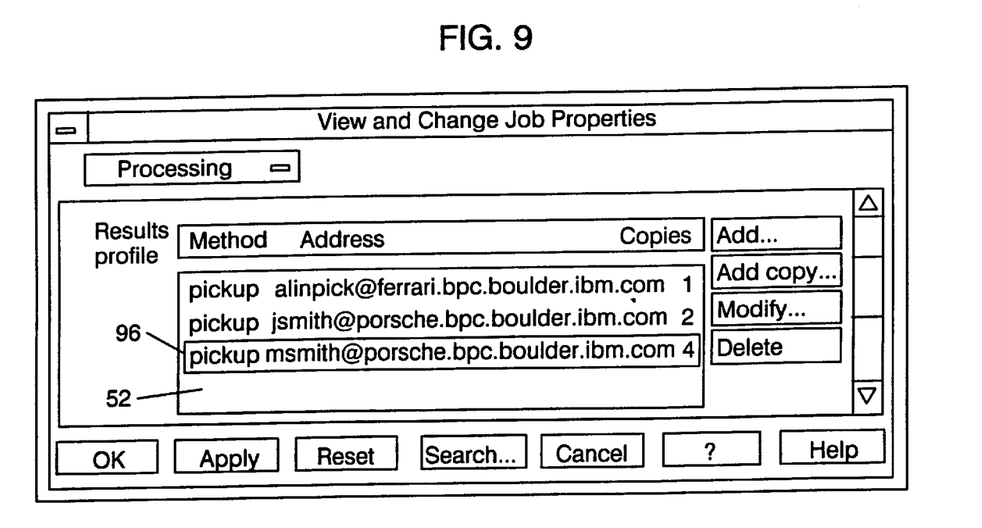
FIG. 9 is a typical window showing the modified value in the list box.

When the modifications are complete, the user selects the modify pushbutton 102 as shown in FIG. 8B. FIG. 9 shows list box 52 with value 96 modified as shown in FIG. 8B.

Although not illustrated in the Figures, the user also can delete a value in the list box 52. To delete a value, the delete pushbutton 68 is selected.

Figures 10, 10A:
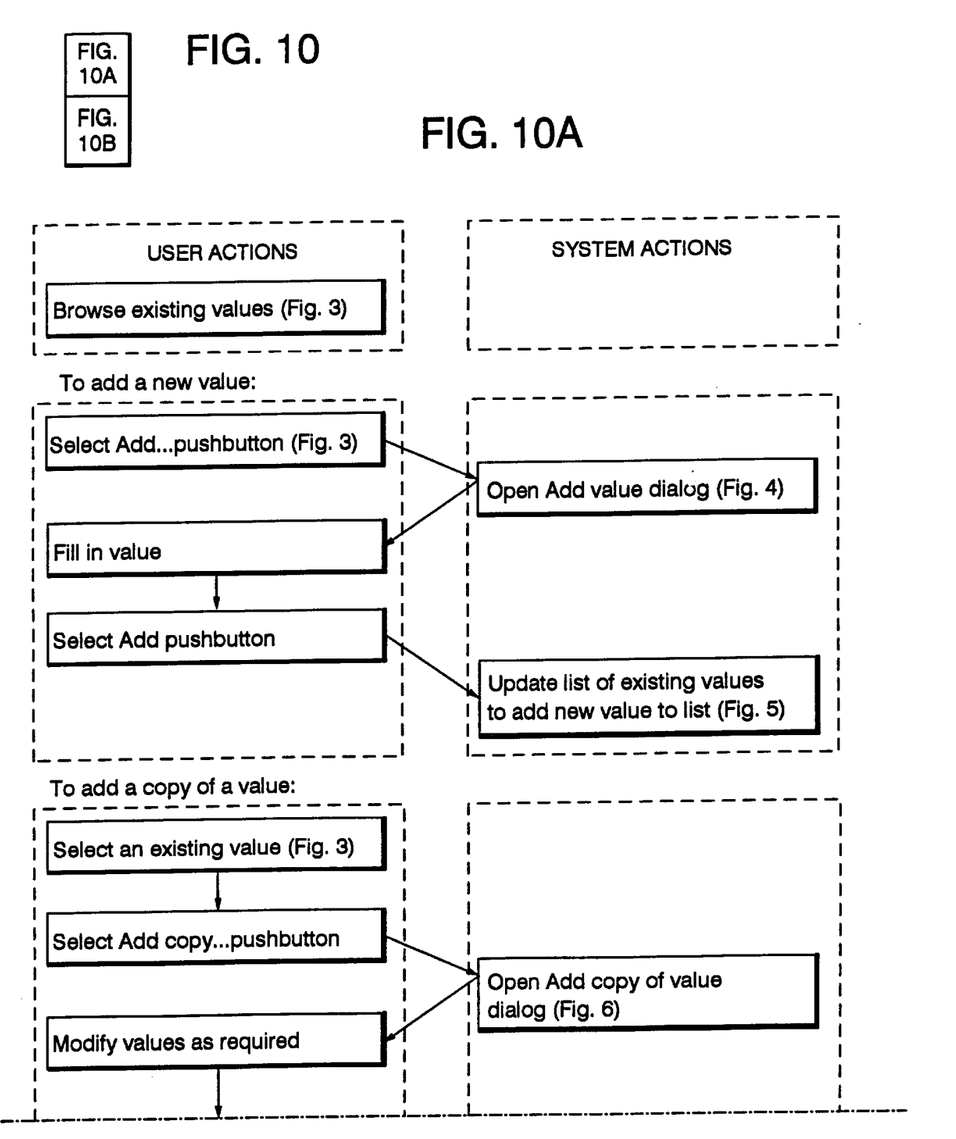
FIG. 10 is a flow chart illustrating the method of the present invention, including FIG. 10A and FIG. 10B.
Figure 10B:
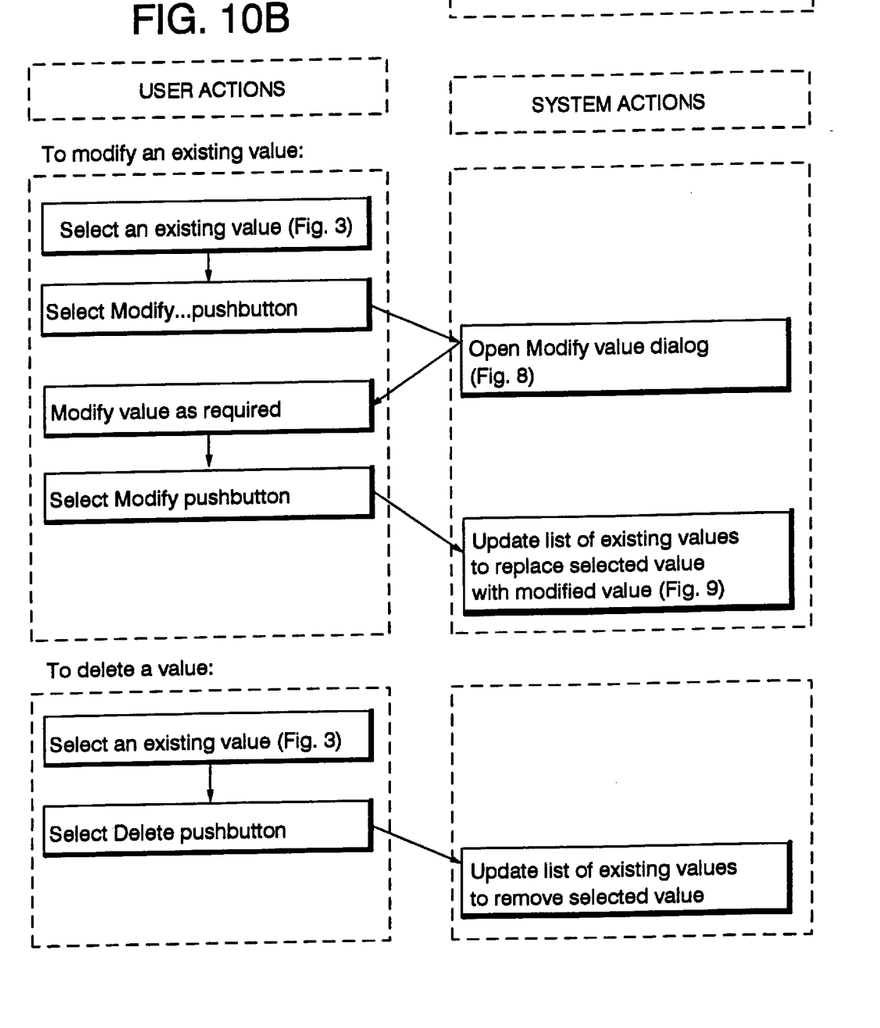

FIG. 10 shows the method of the present invention.

Although the invention has been described with a certain degree of particularity, it should be recognized that elements thereof may be altered by person(s) skilled in the art without departing from the spirit and scope of the invention. The invention is limited only by the following claims and their equivalents.

What is claimed is:

1. An application for creating a list of multiple values, wherein each value is comprised of multiple component values, wherein the application is controlled by a computer system having at least a visual operator interface, an operating system for controlling the operation of program applications within the computer system, and memory for storing a program application, the application comprising:

means for selecting a first window showing a list box for the values, wherein the displayed list box displays a list of values, the list box containing a heading for each component value;

means for selecting a first add pushbutton to view a second window in which each component may be filled in for an additional value to be added to the list box;

means for filling in each component value in the second window; and means for selecting a second add pushbutton in the second window causing the first window to appear displaying the list box of values including the added value.

2. An application for copying a first value in a list box to create a second value in the list box, wherein a value is comprised of multiple component values, wherein the application is controlled by a computer system having at least a visual operator interface, an operating system for controlling the operation of program applications within the computer system, and memory for storing a program application, the application comprising:

means for selecting the first value from a first window showing the list box, wherein the displayed list box displays a list of values;

means for selecting a first add copy pushbutton to view a second window showing the second value with each component value filled-in as for the selected first value; and means for selecting a second add copy pushbutton in the second window causing the first window to appear displaying the list box of values including the second value as a new entry in the displayed list box.

3. An application for copying a first value with one or more component values in a list box to create a second value in the list box in accordance with claim 2 further comprising:

means for modifying the component values of the second value as desired prior to selecting the second add copy pushbutton.

4. An application for revising a value in a list box displaying multiple values, wherein a value is comprised of multiple components values, wherein the application is controlled by a computer system having at least a visual operator interface, an operating system for controlling the operation of program applications within the computer system, and memory for storing a program application, the application comprising:

means for selecting a first window displaying a list box, wherein the displayed list box displays a list of values, means for selecting the value to be modified from the first window;

means for selecting a modify pushbutton to view a second window showing the components of the selected value;

means for modifying as desired the components shown in the second window; and means for selecting a second modify pushbutton causing the first window to appear displaying the list box of values including the modified value.

5. A method for creating a list of multiple values, wherein each value is comprised of multiple component values, wherein the application is controlled by a computer system having at least a visual operator interface, an operating system for controlling the operation of program applications within the computer system, and memory for storing a program application, the application comprising:

selecting a first window showing a list box for the values, wherein the displayed list box displays a list of values, the list box containing a heading for each component;

selecting a first add pushbutton to view a second window in which each component may be filled in for an additional value to be added to the list box;

filling in each component in the second window; and selecting a second add pushbutton in the second window causing the first window to appear displaying the list box of values including the additional value.

6. A method for copying a first value to create a second value, wherein the values are comprised of multiple component values, wherein the application is controlled by a computer system having at least a visual operator interface, an operating system for controlling the operation of program applications within the computer system, and memory for storing a program application, the application comprising:

selecting the first value from a first window showing the list box, wherein the displayed list box displays a list of values;

selecting a first add copy pushbutton to view a second window showing the second value with each component filled-in as for the selected first value; and selecting a second add copy pushbutton in the second window causing the first window to appear displaying the list box of values including the second value as a new entry in the displayed list box.

7. A method for copying a first value with one or more component values in a list box to create a second value in the list box in accordance with claim 6 further comprising the steps of:

modifying the component values of the second value as desired prior to selecting the second add copy pushbutton.

8. A method for revising a value, wherein the value is comprised of multiple component values, wherein the application is controlled by a computer system having at least a visual operator interface, an operating system for controlling the operation of program applications within the computer system, and memory for storing a program application, the application comprising:

selecting a first window displaying a list box, wherein the displayed list box displays a list of values, selecting the value to be modified from the first window;

selecting a modify pushbutton to view a second window showing the components of the selected value;

modifying as desired the components shown in the second window; and selecting a second modify pushbutton causing the first window to appear displaying the list box of values including the modified value.

* * * * *

UNITED STATES PATENT AND TRADEMARK OFFICE
CERTIFICATE OF CORRECTION

PATENT NO. : 5,867,157
DATED : February 2, 1999
INVENTOR(S) : Goddard et al.

It is certified that error appears in the above-identified patent and that said Letters Patent are hereby corrected as shown below:

Col. 7, line 3 and 4, delete "one or more" and insert multiple

Col 7, line 4, after "value", insert with multiple component values

Col. 7, line 11, delete "components" and insert component

Signed and Sealed this

Tenth Day of April, 2001

*Attest:*

NICHOLAS P. GODICI

*Attesting Officer*        *Acting Director of the United States Patent and Trademark Office*

UNITED STATES PATENT AND TRADEMARK OFFICE
CERTIFICATE OF CORRECTION

PATENT NO. : 5,867,157
DATED : February 2, 1999
INVENTOR(S) : Goddard et al.

It is certified that error appears in the above-identified patent and that said Letters Patent is hereby corrected as shown below:

Column 7,
Lines 3 and 4, delete "one or more" and insert -- multiple --.
Line 4, after "value", insert -- with multiple component values --.
Line 11, delete "components" and insert -- component --.

This certificate supersedes Certificate of Correction issued April 10, 2001.

Signed and Sealed this

Twentieth Day of December, 2005

JON W. DUDAS
*Director of the United States Patent and Trademark Office*